Aug. 11, 1936.  A. R. MORRILL  2,050,499
MACHINE FOR OPERATING UPON SHOES
Filed June 7, 1934   8 Sheets-Sheet 6
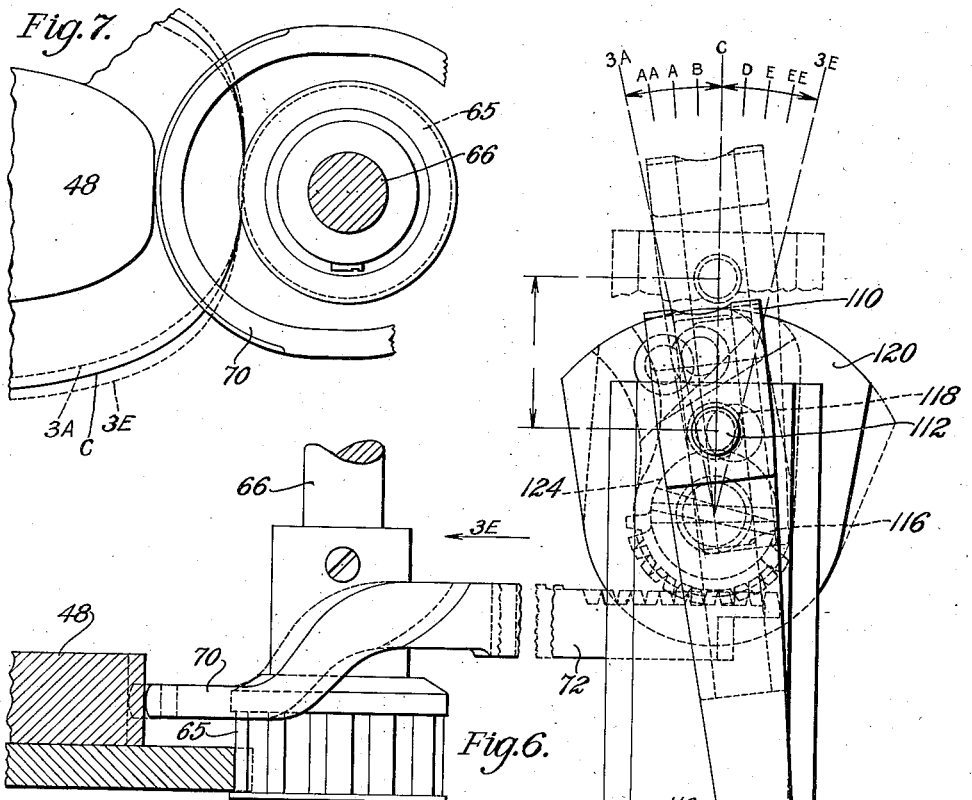
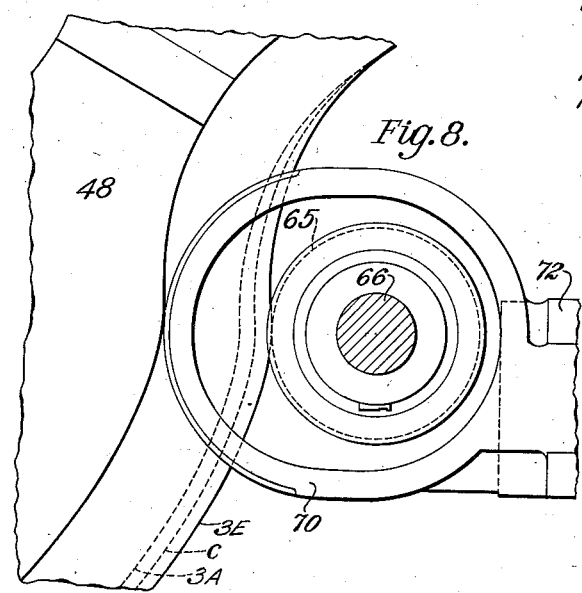
Witness
Frank A. Wright
Inventor
Alfred R. Morrill
by Fish Hildreth
Cary & Jenney Atty.

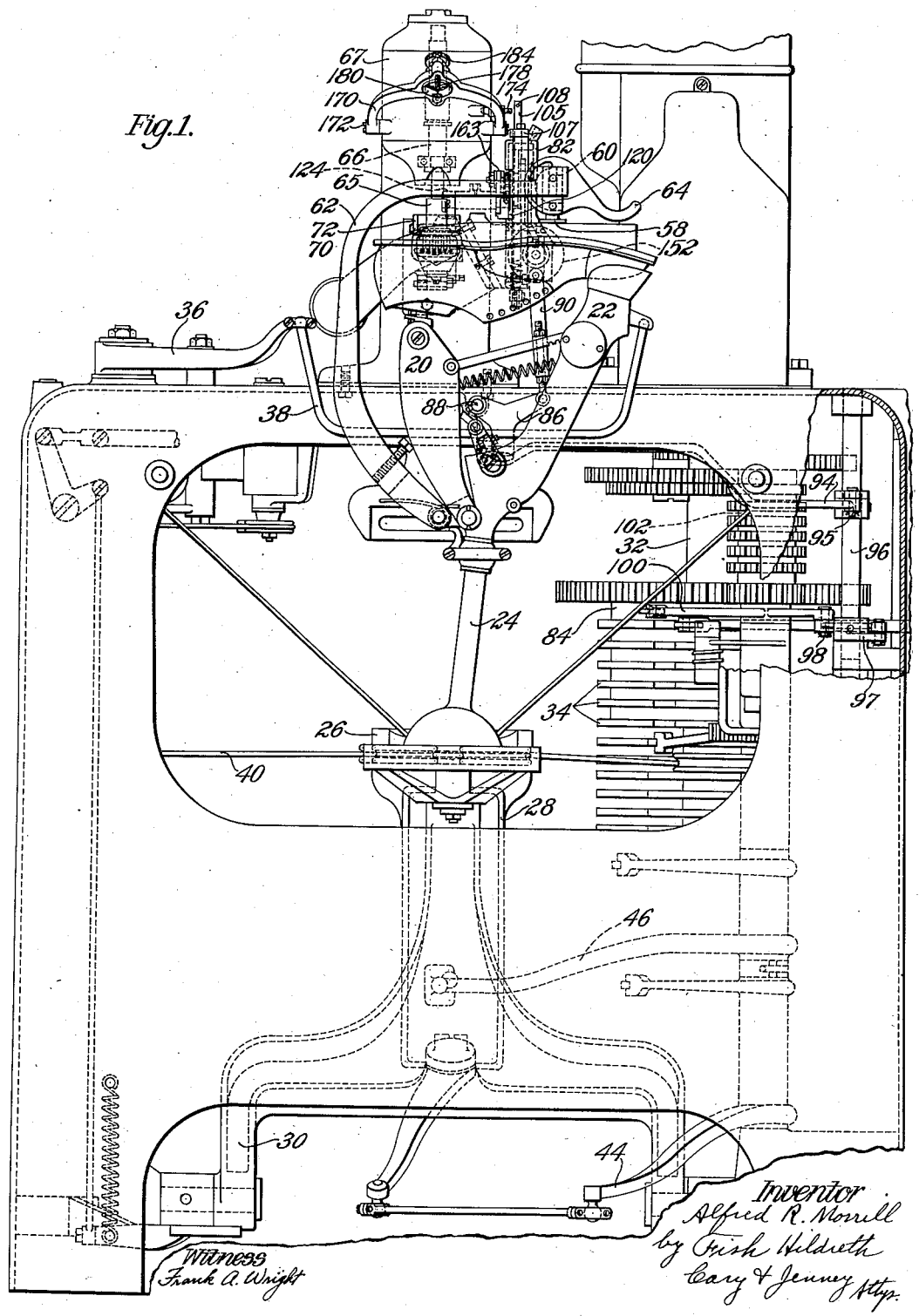

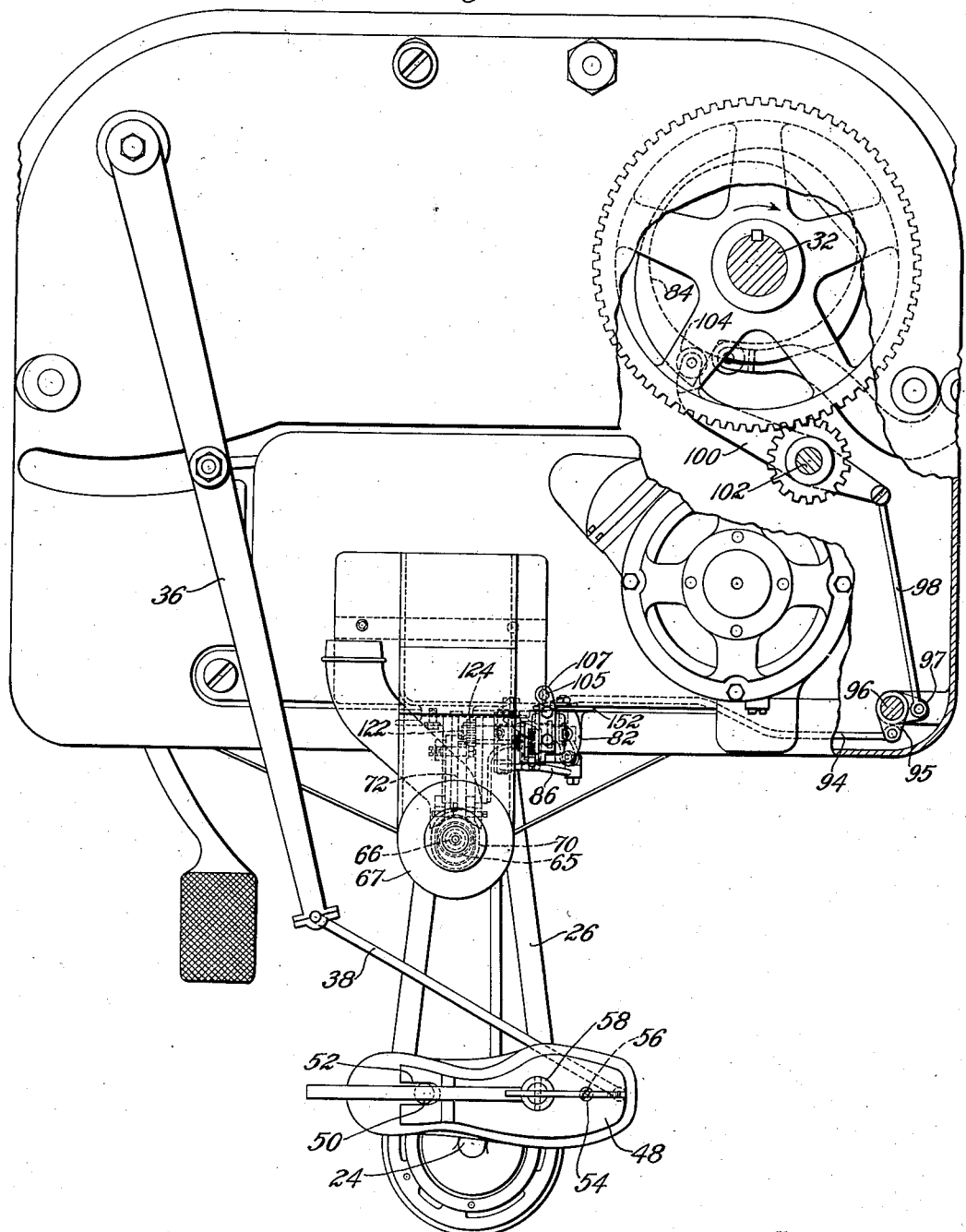

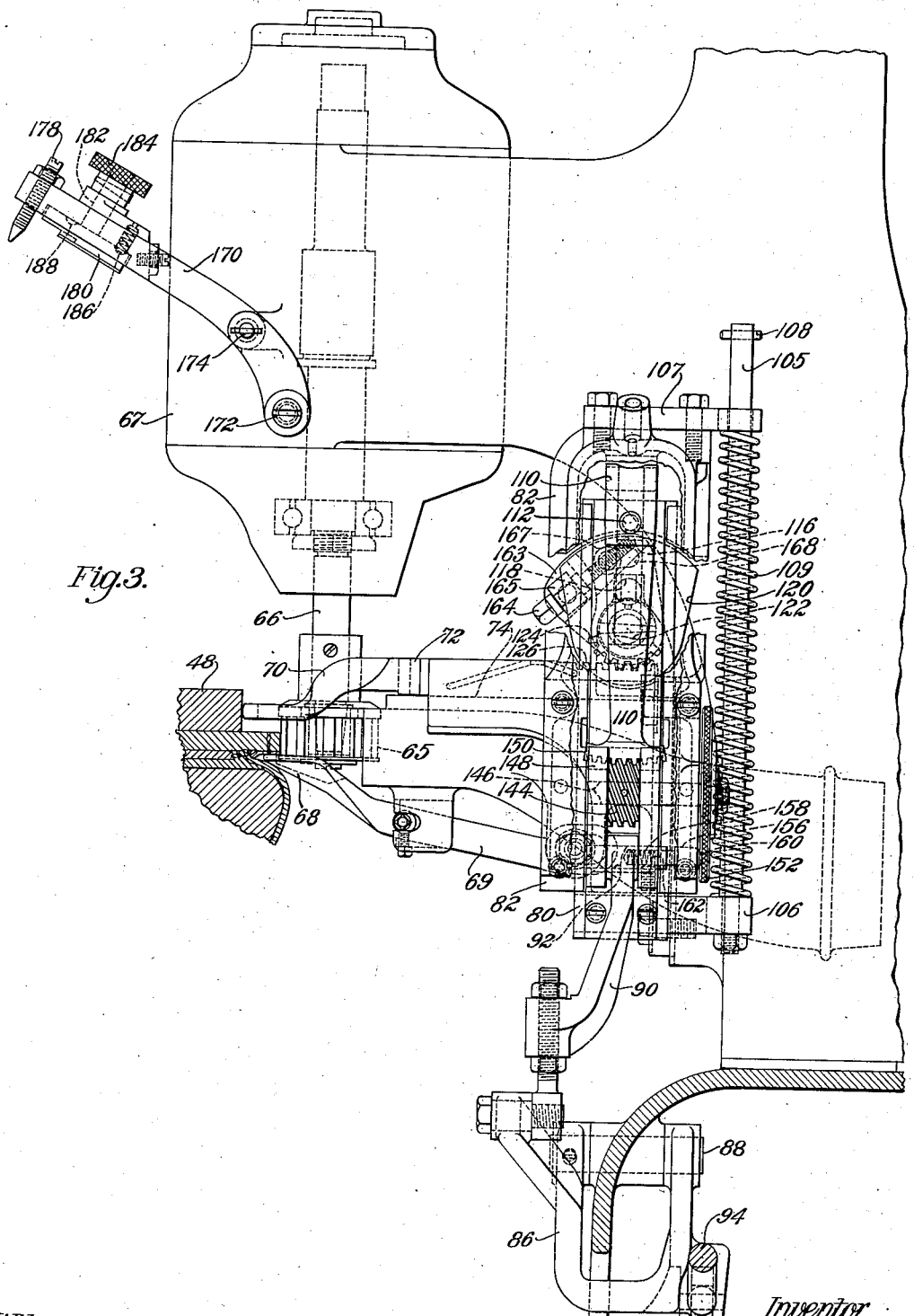

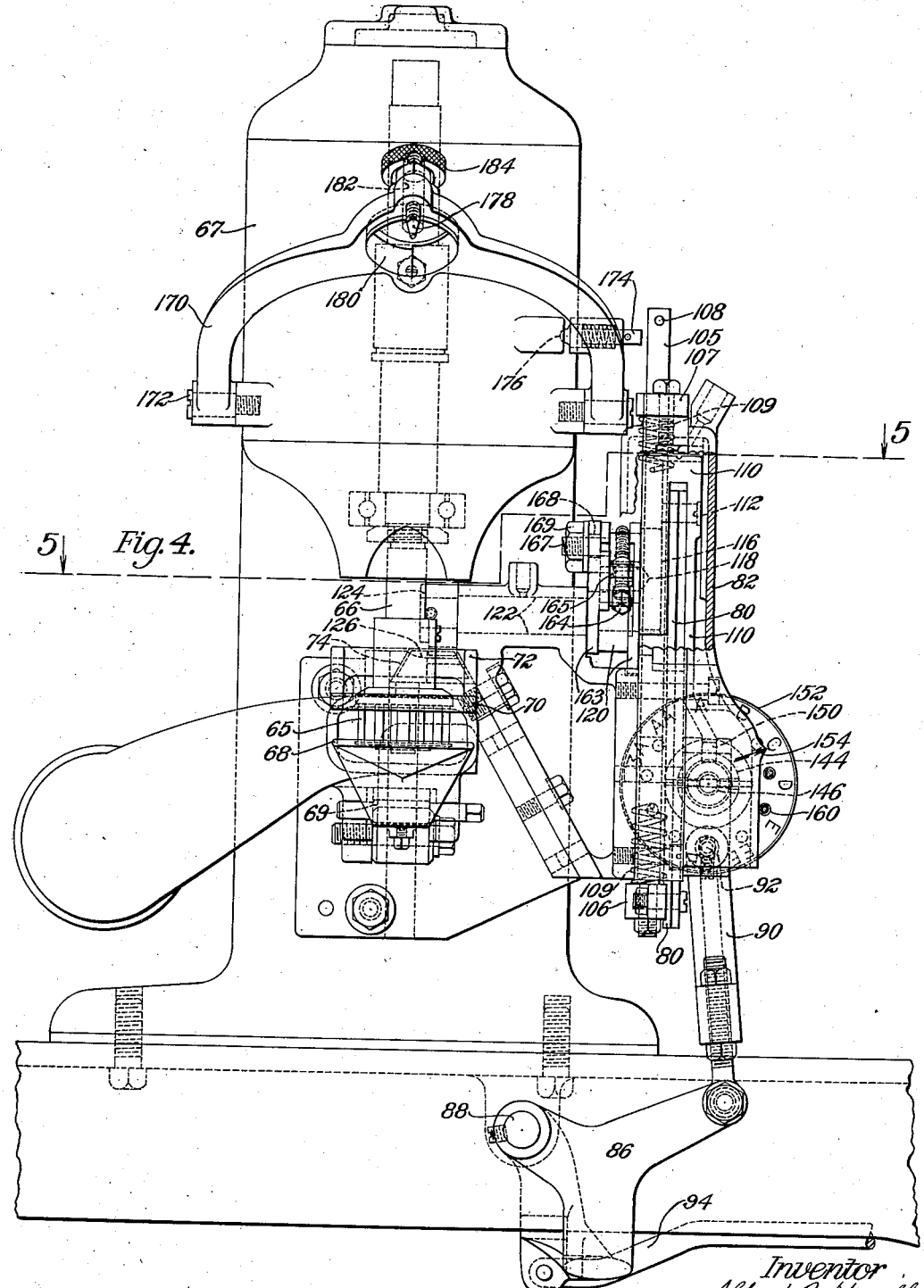

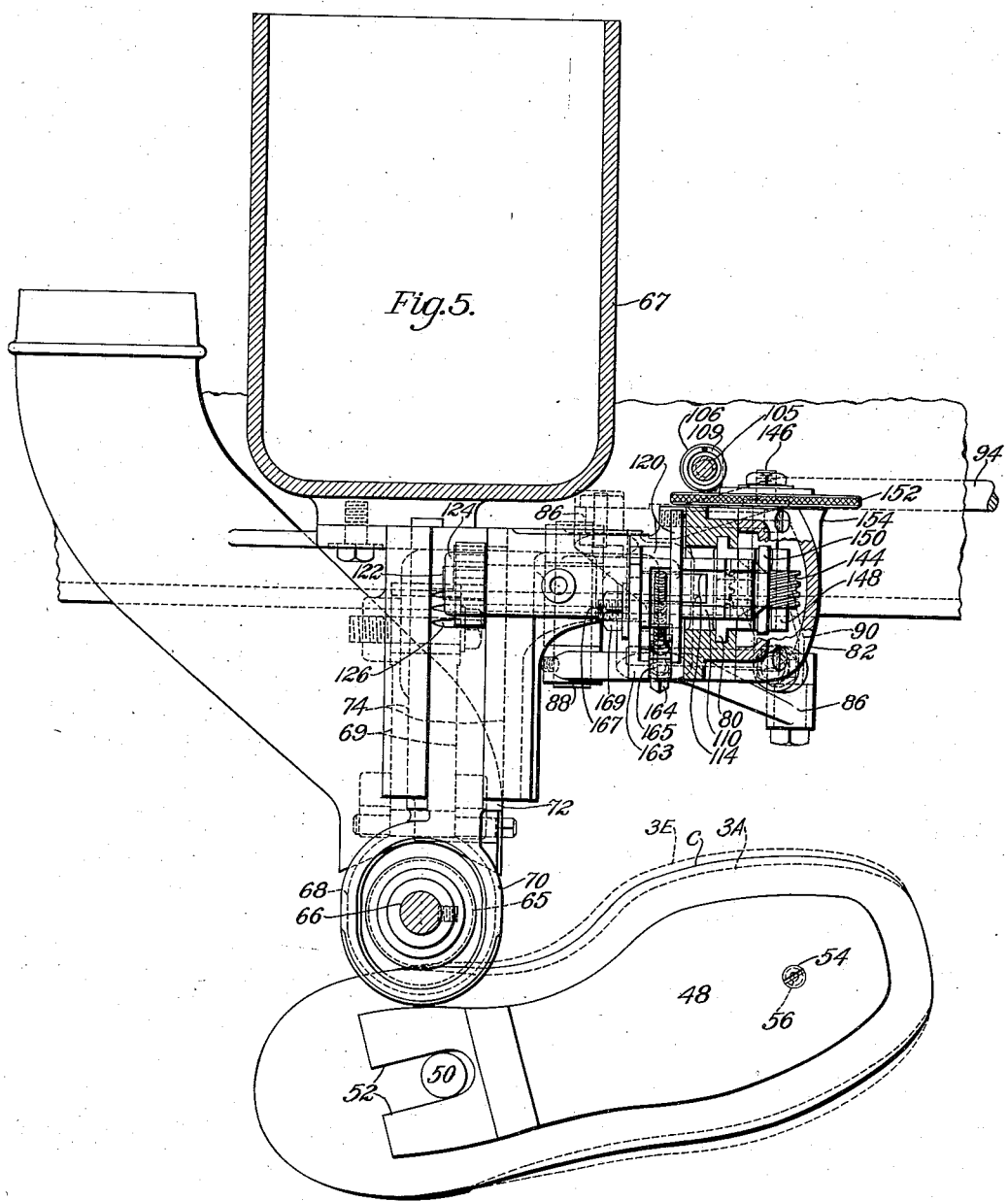

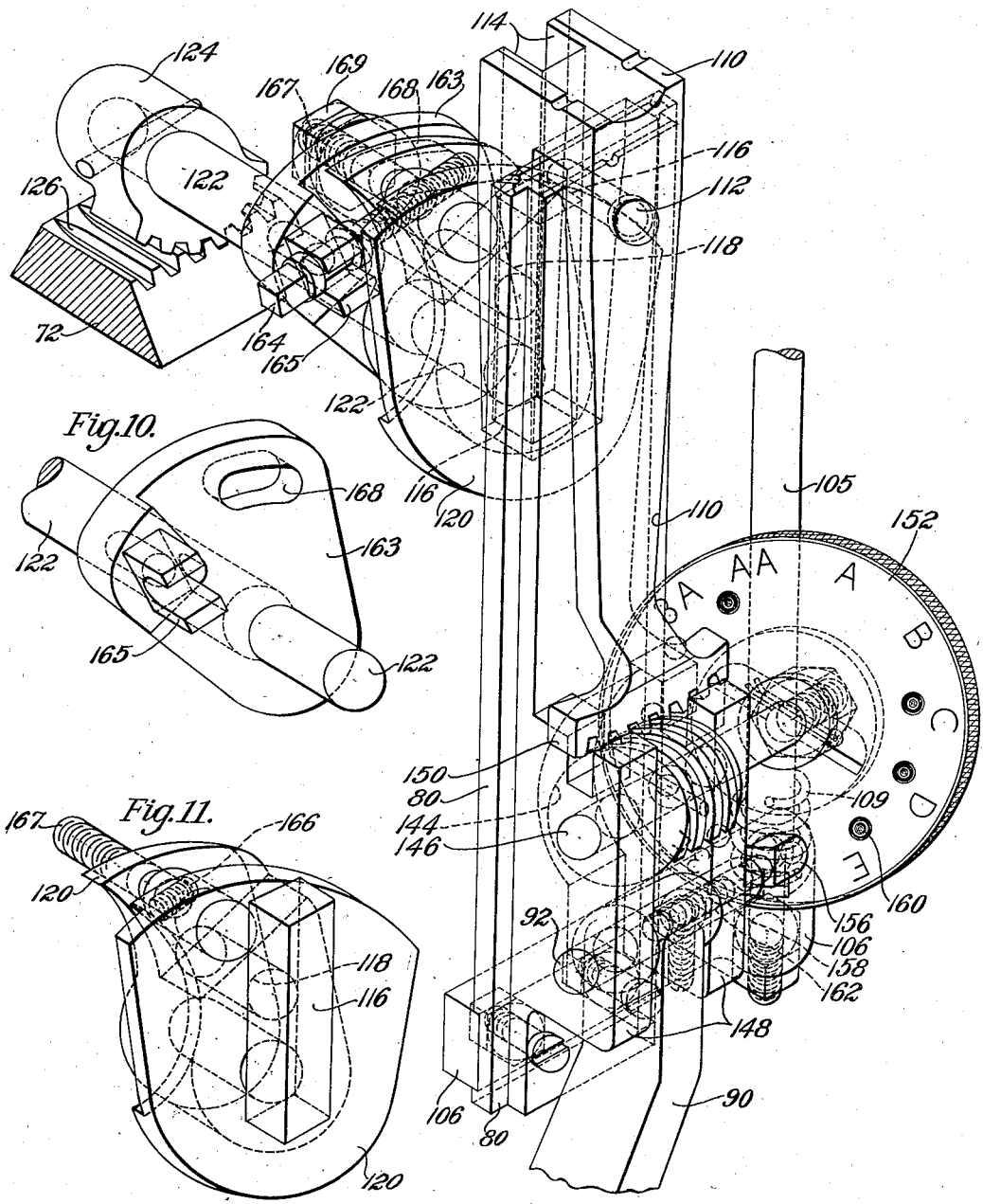

Aug. 11, 1936.                A. R. MORRILL                2,050,499
                    MACHINE FOR OPERATING UPON SHOES
                         Filed June 7, 1934           8 Sheets-Sheet 8
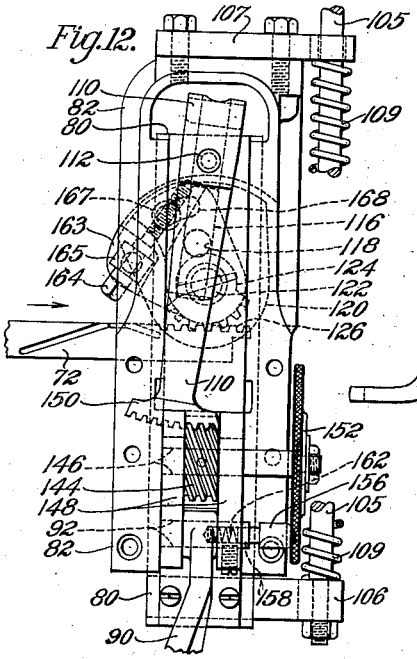
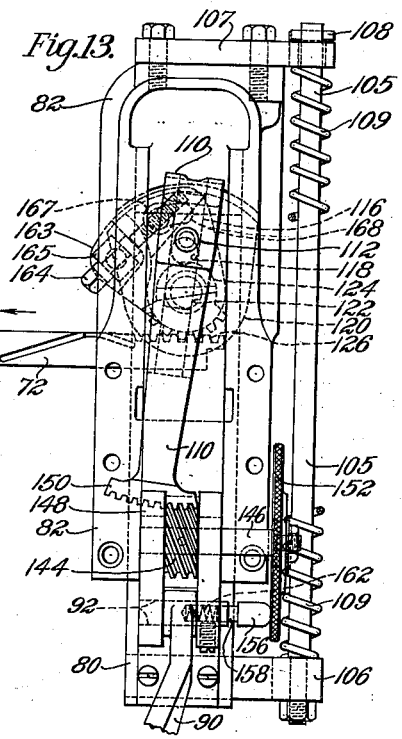
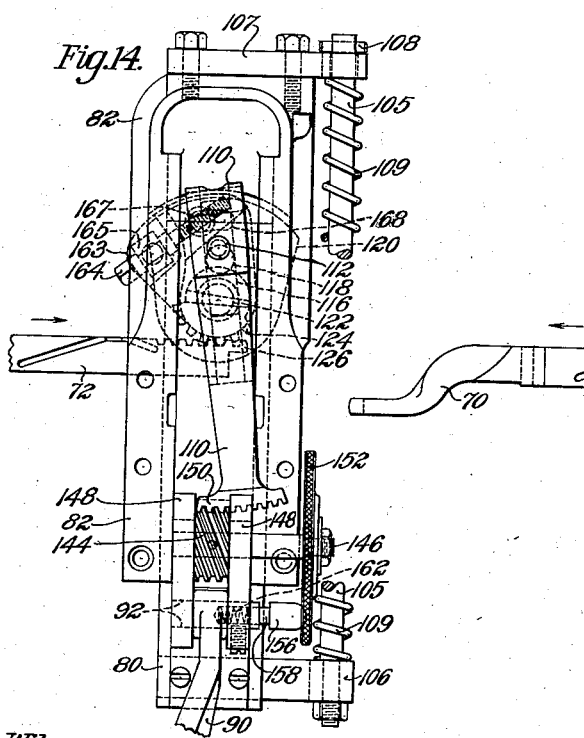
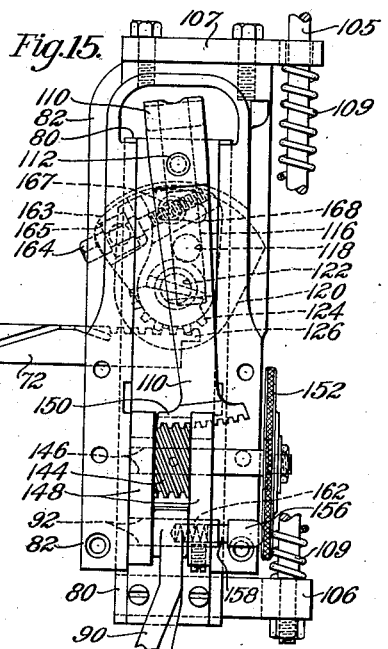

Patented Aug. 11, 1936

2,050,499

UNITED STATES PATENT OFFICE 2,050,499

MACHINE FOR OPERATING UPON SHOES

Alfred R. Morrill, Beverly, Mass., assignor to United Shoe Machinery Corporation, Paterson, N. J., a corporation of New Jersey Application June 7, 1934, Serial No. 729,399

15 Claims. (Cl. 12—17)

The present invention relates to machines which are used in the manufacture of shoes to perform certain operations progressively along the bottom margin of a shoe, and is hereinafter disclosed as embodied in an edge trimming machine of the type in which the shoe and the edge trimming devices are moved relatively to transfer the point of operation about the shoe, and in which mechanism is provided for relatively moving the edge trimming devices and the shoe to maintain the edge trimming devices and the shoe in proper relative positions at the point of operation as such point is transferred about the shoe.

In order to determine accurately the contour path followed by the operating means around the margin of the shoe being operated upon, it has been proposed to utilize the guiding surface of a templet which conforms preferably to the contour path to be followed by the operating devices around the margin of the shoe sole, and operates to locate the shoe margin laterally at all times with relation to the operating means as the point of operation progresses around the shoe.

With the usual construction and arrangement of the templet and guiding device cooperating therewith, it has been found necessary to provide a new templet for each size and shape of shoe which is to be operated upon in the machine.

It is a principal object of the present invention to provide a guiding means which cooperates with a templet to locate the shoe margin laterally with relation to the shoe operating means at the point of contact, and may be adjusted to cause the operating means to follow any one of a plurality of predetermined contour paths about the shoe, and thus to reduce materially the number of templets required for use in the manufacture of a wide range of sizes and shapes of shoes.

More specifically, it is another object of the present invention to provide a novel and improved automatic machine for trimming or rounding the sole of a lasted shoe which is provided with a templet fixed with relation to the shoe and a guiding device including an edge gage engaging the templet and means for controlling the position of the edge gage during the transfer of the point of operation about the shoe adjustable to cause the trimming operation to follow any one of a number of predetermined contour paths around the shoe.

With these and other objects in view, as may hereinafter appear, the several features of the invention consist in the devices, combinations and arrangement of parts hereinafter described and claimed, which together with the advantages to be obtained thereby, will be readily understood by one skilled in the art from the following description taken in connection with the accompanying drawings, in which Fig. 1 is a view in front elevation of an automatic machine for trimming the shank and fore part of a lasted shoe while supported on a jack; Fig. 2 is a plan view of the machine shown in Fig. 1, with portions broken away to illustrate underlying parts; Fig. 3 is a view in right side elevation partly in section, to illustrate particularly the cutter head and portions of the mechanism for controlling the position of the edge gage during the transfer of the point of operation around the shoe; Fig. 4 is a view in front elevation of substantially the parts shown in Fig. 3; Fig. 5 is a sectional plan view taken on the line 5—5 of Fig. 4; Fig. 6 is an enlarged detail view of the mechanism for controlling the position of the edge gage during the transfer of the point of operation around the shoe, and the adjusting means for varying the operation of the edge gage to cause the shoe operating means to follow any one of several contour paths around the shoe; Fig. 7 is a somewhat diagrammatic plan view showing the operative positions of the trimming cutter, edge gage, templet and shoe at the toe of the shoe under varying conditions; Fig. 8 is a similar view illustrating by full and dotted lines the different contours which will be produced along the side of the shoe from the same templet for shoes of the same length but of varying widths; Fig. 9 is a perspective view of the mechanism for controlling the position of the edge gage illustrated in Fig. 6; Figs. 10 and 11 are perspective views of component parts of the adjustable sliding block carrier for controlling the position of the edge gage; Figs. 12 to 15 inclusive comprise a series of detail views illustrating the adjustment and operation of the mechanism for controlling the position of the edge gage; in Figs. 12 and 13 the control mechanism has been set for operation on a very narrow shoe, Fig. 12 illustrating the position of the parts on the shank portion of the shoe, and Fig. 13 illustrating the parts at the toe portion; Figs. 14 and 15 similarly illustrate the setting of the control mechanism for the production of a very wide shoe, Fig. 14 showing the position of the parts at the toe portion of the shoe, and Fig. 15 showing the position of the parts at either the side or the ball or the shank portion of the shoe.

The machine illustrated in the drawings as embodying the several features of the present invention, is an automatic machine of the type illustrated and described in the applicant's prior Patents No. 1,897,526, dated February 14, 1933, and No. 1,921,165, dated August 8, 1933, which disclose an automatic edge trimming machine comprising suitable tools for performing an edge trimming operation progressively along the bottom margin of the lasted shoe, a jack upon which the shoe is supported, and means for automatically controlling the movements of the jack, so that no manual manipulation of the shoe by the operator is required during the operation.

The jack of the machine illustrated in the drawings, comprises heel and toe supports 20 and 22 which are supported upon a vertical spindle 24, and which are actuated to clamp a lasted shoe automatically in proper position on the jack when the shoe is placed upon the jack by the operator, and which are automatically actuated at the conclusion of the edge trimming operation to unclamp the shoe. This jack is the same in construction and mode of operation as the jack disclosed in applicant's prior Patent No. 1,689,594, dated October 30, 1928. During the edge trimming operation, the jack is moved in the direction of feed, and is rotated to transfer the point of operation about the shoe from the heel breast of the shoe at one side to the heel breast at the other side, and simultaneously tipping movements are imparted to the jack to compensate for the transverse and longitudinal curvatures of the shoe sole. To enable the jack to be so actuated, it is mounted in the machine in the same manner as the jack of applicant's prior patent above referred to, and is acted upon by mechanism constructed, arranged and operated as the corresponding mechanism of the machine of said patent.

Briefly stated, the jack supporting structure comprises an arm 26 in the forward end of which the lower end of the jack spindle 24 is rotatably mounted by means of a gimbal joint, a support 28 upon which the arm 26 is mounted to swing vertically, and a frame 30 pivotally mounted at its lower end in the machine base so as to be capable of swinging about a horizontal axis, and upon which the support 28 is mounted to swing about a substantially vertical axis. The mechanism for moving the jack in the direction of feed, for rotating the jack, and for imparting tipping movements to the jack, comprises a vertical pattern cam shaft 32 upon which a series of pattern cams 34 are mounted, and connections from the cam shaft to the jack and jack supporting structure comprising the feed lever 36 connected by the link 38 to the toe portion 22 of the jack, the cord 40 passing around a wheel mounted in the forward end of the arm 26 and connected through the gimbal joint to the jack spindle 24, and cam levers 44 and 46 connected respectively to the frame 30 and support 28.

A templet under the guidance of which the edge trimming operation is performed upon a shoe sole, is indicated at 48. This templet consists of a rigid block of wood, the surface of which fits closely against the sole surface. The templet is shaped to extend over the fore part and shank only, and is formed with a peripheral contour having a definite relationship to the outline which the edge of the outsole is to have in these parts of a finished shoe of a predetermined length and width. The templet is located on the shoe by means of a pin 50 projecting from the last through a perforation in the sole of the shoe into a slot 52 formed in the heel end of the templet, and by means of a pin 54 projecting from the sole engaging surface of the templet at its toe portion, and engaging an indentation 56 formed in the surface of the sole. The templet is firmly clamped in position by means of a clamping plate 58 at the lower end of a plunger 60 which is mounted in a vertical guideway in the outer end of a supporting arm 62, and is arranged to be actuated by a manually operated cam lever 64 pivotally mounted on the arm. The arm 62 is pivotally supported at its lower end on the lower part of the heel portion 20 of the jack to permit a swinging movement of the arm into and out of clamping position. When mounted in position on the shoe sole, as shown, for instance, in Fig. 1, the edge of the templet is at some distance inside of the sole edge in position to cooperate with an edge guide during the trimming operation.

The operating devices of the present machine comprise a rotary cutter 65 which is supported on and directly driven from the armature shaft 66 of an electric motor mounted in a substantially vertical position within a motor housing 67. For positioning the work vertically with relation to the cutter, a work table is provided comprising a semi-circular plate 68 adapted to engage in the recess between the sole and upper of the shoe and recessed to receive the bottom edge of the cutter. The work table 68 is formed on the forward end of an arm 69 which is mounted for both horizontal and vertical adjustment on the machine frame.

The present machine is also provided, as best illustrated in Figs. 3, 5, 8, 13 and 15, with a templet guide or edge gage comprising a slide 72 having formed thereon a circular guiding member or gage 70 which extends around and in front of the cutter and the cutter spindle, and is provided on its forward end with a semi-circular bearing surface for engagement with the templet, these parts being arranged so that the cutter will be maintained at a substantially constant distance from the edge of the templet regardless of any turning movements of the shoe and templet with relation thereto. The shank portion 72 of the edge gage 70 is mounted in a guideway 74 for sliding movements to determine the position of the bearing surface of the edge gage 70 with relation to the cutter, and thus to determine the location of the shoe margin with relation to the templet as the point of operation is transferred about the shoe.

In carrying out certain features of the present invention, a mechanism has been provided for controlling the position of the templet guide or edge gage as the point of operation is transferred about the shoe to cause the operating means, and more specifically the trimming cutter to follow any one of a number of predetermined marginal contour paths about the shoe with relation to a single guiding templet supported thereon. The marginal contour paths developed in this manner from a single templet, will vary from each other and from the templet employed in definite and easily ascertainable proportions to permit graded variations in the length or width of shoe produced.

With the present construction, it is proposed to use a single templet for each size or length of shoe, and a control mechanism for controlling the position of the edge gage with relation to the shoe operating means, as the point of operation is transferred about the shoe, adjustable to cause the operating means to follow any one of several predetermined marginal contour paths corresponding to shoes of different widths. The single templet employed corresponds in outline to the marginal contour of a C width shoe, this intermediate width having been chosen for convenience and to simplify so far as possible the construction and operation of the machine. When a C width shoe is to be operated upon, an adjustment of the control mechanism is made which causes the edge gage 70 to be maintained in a stationary position during the transfer of the point of operation about the shoe. If a narrower than C width shoe is to be operated upon, the control mechanism is adjusted to cause the edge gage to be retracted during certain portions of the operation around the shoe, so that the operating means will follow a relatively narrow contour path. Similarly, when a wider than C width shoe is to be operated upon, an adjustment of the control mechanism is made to cause the edge gage to be moved forwardly with relation to the operating means during the transfer of the point of operation about certain portions of the shoe to cause the operating means to follow a contour path corresponding to a relatively wide shoe.

The mechanism through which positioning movements are imparted to the edge gage 70 comprises a carriage or slide 80 which is mounted for vertical movements in a guideway 82, and is moved in accordance with a predetermined pattern in timed relation to the transfer of the point of operation around the shoe by means of connections which are controlled from a cam 84 mounted on the pattern cam shaft 32 (see Fig. 2) of the machine. These connections comprise a bell-crank 86 (Figs. 1, 3 and 4) which is mounted beneath the slide 80 to turn on a stationary pivot 88, and an adjustable link 90 which is connected at its upper end to a bearing pin 92 in the slide 80, and at its lower end to one arm of the bell-crank 86. The other arm of the bell-crank 86 is connected through a laterally extending link 94 to an arm 95 supported on a rock shaft 96 which also carries an arm 97 connected through a link 98 to a cam lever 100. The cam lever 100 is supported intermediate its length on the usual cam lever supporting shaft 102, and is provided at its free end with a cam roll 104 arranged to ride on the peripheral surface of the cam 84 on the pattern cam shaft 32.

In order to avoid backlash and to insure the movement of the slide to its bottom or neutral position as determined by the contour of the cam 84, a rod 105 is provided which is secured at its lower end to a bracket 106 formed in the bottom end of the slide 80, and at its upper end is arranged to slide in a bearing formed in a bracket 107 secured to the machine frame. A compression spring 109 coiled about the rod 105, and arranged at one end to bear against the bracket 107 and at its other end against the bracket 106, tends to force the slide downwardly to a limiting position which is determined by the engagement of a cross pin 108 in the upper end of the rod 105 with the upper side of the bracket 107.

The movements of the slide under the influence of its actuating cam 84 as above pointed out follow, with relation to the transfer of the point of operation about the shoe, a definite pattern which is transmitted in modified form (by means of mechanism hereinafter to be described) to the edge gage 70, and serve to control the shape of the path followed by the operating tools with relation to the guiding surface of the templet. The mechanism through which the movements of the slide 80 are made effective to control the position of the edge gage is adjustable to vary the extent and character of these movements, and thus to secure predetermined changes in the contour path followed by the operating tools with relation to the templet.

The movement of the slide under the influence of its actuating cam 84 as above pointed out, follows, with relation to the transfer of the point of operation about the shoe, a definite pattern which is transmitted in modified form by means of mechanism hereinafter to be described, to the edge gage 70, and serves to control the shape of the path followed by the operating tools with relation to the guiding surface of the templet. With the construction herein disclosed, adjustments may be made in this mechanism for controlling the position of the edge gage to vary the extent and character of the movements imparted thereto, in order to secure variations in width in the manufacture of a shoe having a given length, and making use of a single templet over the entire range of widths from 3A to 3E. The mechanism through which these motions are transmitted comprises a U-shaped lever 110 best shown in Figs. 6 and 9 which is adjustably mounted on a pivot 112 on the upper end of the slide 80, and has formed on one arm thereof a slot or guideway 114 adapted to receive a follower block 116. The block 116 is pivoted at 118 to the free end of a lever arm in the form of a plate 120 which is adjustably secured to one end of a rock shaft 122, the other end of which carries a gear segment 124 which meshes with a rack 126 formed on the upper side of the shaft portion 72 of the edge gage. As the slide 80 is moved up and down following the contours of the actuating cam 84, the pivot pin 118 for the follower plug 116 will be moved to the right or to the left of its central position depending upon the angular position of the U-shaped lever 110, causing the vertical movements of the slide to be translated into a rotational movement of the rock shaft 122, the extent of which is determined by the angle at which the guideway 114 is set with relation to the direction of movement of the slide. With this construction and arrangement of parts, the variations in the contour path followed by the operating tools with relation to the grinding contour of the templet, will be roughly proportional for different adjustments in the angular position of the U-shaped lever 110.

Figs. 5, 7 and 8 of the drawings illustrate the marginal contour paths followed by the operating means during the transfer of the point of operation about the shoe for three separate adjustments of the position of the U-shaped lever 110 as set to produce respectively a sole contour for a C shoe, a 3A shoe and a 3E shoe (see also Figs. 3 and 12 to 15 inclusive). It will be noted that regardless of the setting of the adjusting lever 110, a uniform width of margin is preserved around the toe portion of the shoe, so that all of the shoes manufactured with the same templet will have the same length, although varying in width in accordance with the adjustment above described. In order to secure a uniform width of margin around the toe, the movements of the slide 80 are arranged to cause the slide to reach its lowest position as the point of operation passes around the toe, and simultaneously to cause the pivot 118 for the slide block 116 to move substantially into line with the pivot 112 for the adjusting lever 110, so that regardless of the angular adjustment of the adjusting lever 110, the rock shaft 122 and cam lever or plate 120 will be held in a substantially vertical or neutral position at this time.

In order to permit the operator conveniently to set the machine for operation on shoes of different widths, mechanism has been provided for adjusting the angular position of the U-shaped lever 110 in accordance with the width of shoe to be operated upon, comprising a worm 144 which is mounted on a cross shaft 146 journalled in bearing lugs 148 on the slide 80, and is arranged to mesh with a corresponding toothed segment 150 formed on the arm of the U-shaped lever 110. There is also secured to the cross shaft 146 a disk 152 which is provided with a knurled edge for convenience of manipulation by the operator, and is provided on one face with markings which may be read in connection with a pointer indicated at 154 in Fig. 4, to designate the setting of the device for the different widths of shoe to be operated upon. The disk or dial 152 is centered in its adjusted position corresponding to the width of shoe by means of a plunger 156 which is seated in a recess 158 formed in the pivot shaft 92 on the slide 80, and is forced yieldingly into engagement with a corresponding cup-shaped recess 160 in the face of the disk 152 by means of a small compression spring 162 seated in the recess 158 behind the plunger 156.

In order to permit an adjustment of the edge gage with relation to the controlling devices above described, the plate 120 is mounted for rotational adjustment with relation to a second plate 163 which is formed integrally with the rock shaft 122. The plate 120 is held adjustably in position with relation to the plate 163 and rock shaft 122 by means of an adjusting screw 164 which is fitted to turn with relation to a lug 165 pivoted on the plate 163, and is screw-threaded into a correspondingly threaded bore 166 (see Figs. 9 to 11) in a clamping bolt 167 rigidly mounted in the plate 120. The clamping bolt 167 is arranged to extend through a slot 168 in the plate 163, and has mounted thereon two clamping nuts 169 which act when set up to clamp the two plates 120 and 163 rigidly together in adjusted position. In making an adjustment, it is necessary first to loosen the clamping nuts 169 to permit an adjustment of the relative positions of the two members by the turning of the adjusting screw 164. After the parts have been set in the desired position, the clamping nuts 169 may be again tightened up to lock the parts against relative movement.

To facilitate securing the correct initial setting of the edge gage with relation to the edge trimming cutter, a gage is provided which is substantially that illustrated in the applicant's prior Patent No. 1,921,165 above referred to, and consists of an arm in the form of a yoke 170 pivotally mounted at 172 upon the motor casing, and arranged to be swung manually into position to indicate the correct position for the edge gage 70. The yoke 170 is normally held in a raised inoperative position by the engagement of a spring-pressed locking pin 174 on one arm of the yoke with a corresponding recess 176 in the motor casing. To enable the yoke 170 to act as a gage to position the templet guide 70 properly with relation to the edge of the trimming cutter 65, the yoke is provided with an adjustable screw 178 adapted to engage a cutting edge of the cutter, and with a flat disk 180 adapted to engage the edge gage 70. Inasmuch as the width of the margin of the shoe will be determined by the position of the cutter with relation to the edge gage, and the amount of this margin will vary for different types of shoes, the surface of the disk 180 is graduated so that for different angular positions of the disk, portions of the disk surface having a different spaced relationship to the screw 178 will be brought into operative position to contact with the edge gage 70 to permit a rapid adjustment of the gage for the desired width of margin. The disk 180 is secured to a rotatable pin 182 which is journalled in a boss on the yoke 170, and is provided with a knurled head 184 to enable an operator readily to adjust the angular position of the disk. A spring-pressed pin 186 mounted in the yoke 170 and arranged to engage with one of several recesses 188 formed in the face of the disk 180, tends to hold the disk in its adjusted position.

The nature and scope of the invention having been indicated, and an embodiment of the invention having been specifically described, what is claimed is:

1. A machine for operating upon the bottom margin of a shoe having, in combination, means for operating upon a shoe, a shoe supporting jack, means for relatively moving the jack and operating means to transfer the point of operation about the shoe, a form having a contour surface of a predetermined shape mounted integrally with said jack and shoe supported thereon, a guiding device engaging said surface to relatively position the jack and operating means to locate the shoe margin laterally with relation to the line of feed at the point of operation, a cam actuated in timed relation to the progress of the operation about the shoe, connections actuated by said cam to control the position of the guiding device, and means for controlling said connections to modify the movement of the guiding device produced by the operation of said cam adjustable to cause the operating means to follow any one of a plurality of predetermined marginal contour paths about the shoe.

2. A machine for operating upon the bottom margin of a shoe having, in combination, means for operating upon a shoe, a shoe supporting jack, means for relatively moving the jack and operating means to transfer the point of operation about the shoe, a templet, a movable guiding device engaging the templet to relatively position the jack and operating means to locate the shoe margin laterally with relation to the line of feed at the point of operation, and means for controlling the movements of the guiding device during the transfer of the point of operation about the shoe adjustable to cause the operating means to follow any one of a plurality of predetermined marginal contour paths about the shoe.

3. A machine for operating upon the bottom margin of a shoe having, in combination, means for operating upon a shoe, a shoe supporting jack, means for relatively moving the jack and operating means to transfer the point of operation about the shoe, a templet, and a movable guiding device engaging the templet to relatively position the jack and operating means to locate the shoe margin laterally with relation to the line of feed at the point of operation and arranged to move during the transfer of the point of operation about the shoe to cause the operating means to follow any one of a plurality of predetermined marginal contour paths about the shoe.

4. A machine for operating upon the bottom margin of a shoe having, in combination, means for operating upon a shoe, a shoe supporting jack, means for relatively moving the jack and operating means to transfer the point of operation about the shoe, a templet having a guiding surface determined for a predetermined length of shoe, a movable guiding device engaging the templet to relatively position the jack and operating means to locate the shoe margin laterally with relation to the line of feed at the point of operation, and means for controlling the movements of the guiding device during the transfer of the point of operation about the shoe adjustable to cause the operating means to follow any one of a plurality of predetermined marginal contour paths about the shoe in accordance with the width of shoe being operated upon.

5. A machine for operating upon the bottom margin of a shoe having, in combination, means for operating upon a shoe, a shoe supporting jack, means for relatively moving the jack and operating means to transfer the point of operation about the shoe, a templet having a guiding contour surface determined for a shoe of a predetermined width and length, a movable guiding device engaging the templet to relatively position the jack and operating means to locate the shoe margin laterally with relation to the line of feed at the point of operation, and means for controlling the movements of the guiding device during the transfer of the point of operation about the shoe adjustable to cause the operating means to follow any one of a plurality of predetermined marginal contour paths about the shoe corresponding to shoes of the same length but varying widths.

6. A machine for operating upon the bottom margin of a shoe having, in combination, means for operating upon a shoe, a shoe supporting jack, means for actuating the jack to transfer the point of operation about the shoe, a templet fixed with relation to the jack and shoe supported thereon, a movable edge gage engaging the templet to locate the shoe margin laterally with relation to the line of feed at the point of operation, and means for controlling the movements of the edge gage during the transfer of the point of operation about the shoe adjustable to cause the operating means to follow any one of a plurality of predetermined contour paths about the shoe.

7. A machine for operating upon the bottom margin of a shoe having, in combination, means for operating upon a shoe, a shoe supporting jack, means for actuating the jack to transfer the point of operation about the shoe, a templet fixed with relation to the jack and shoe supported thereon, a movable edge gage engaging the templet to locate the shoe margin laterally with relation to the line of feed at the point of operation, and means for controlling the movements of the edge gage during the transfer of the point of operation about the shoe adjustable to cause the operating means to follow any one of a plurality of predetermined marginal contour paths about the shoe corresponding to different widths of shoe to be operated upon.

8. A machine for operating upon the bottom margin of a shoe having, in combination, means for operating upon a shoe, a shoe supporting jack, means for actuating the jack to transfer the point of operation about the shoe, a templet fixed with relation to the jack and shoe supported thereon and having a guiding contour surface determined for a shoe of a predetermined width and length, a movable edge gage engaging the templet to locate the shoe margin laterally with relation to the line of feed at the point of operation, and means for controlling the movements of the edge gage during the transfer of the point of operation about the shoe adjustable to cause the operating means to follow any one of a plurality of predetermined marginal contour paths about the shoe corresponding to shoes of the same length and varying widths.

9. A machine for operating upon the bottom margin of a shoe having, in combination, means for operating upon a shoe, a shoe supporting jack, means for actuating the jack to transfer the point of operation about the shoe, a templet fixed with relation to the jack and shoe supported thereon and having a guiding contour surface determined for a shoe of a predetermined width and length, a movable edge gage engaging the templet to locate the shoe margin laterally with relation to the line of feet at the point of operation, and means for controlling the movements of the edge gage during the transfer of the point of operation about the shoe adjustable to cause the operating means to follow a predetermined marginal contour path corresponding to a shoe of the same length but of a narrower width than that determined by the contour of the templet.

10. A machine for operating upon the bottom margin of a shoe having, in combination, means for operating upon a shoe, a shoe supporting jack, means for moving said jack relatively to the operating means to transfer the point of operation about the shoe, a templet fixed with relation to the jack and shoe supported thereon to provide a guiding surface around the shoe, an edge gage adapted to engage with the templet to position the shoe margin laterally with relation to the line of feed at the point of operation, means for controlling the position of the edge gage during the transfer of the point of operation about the shoe comprising a member having a predetermined fixed cycle of movements extending through said operation, and connections controlled by the movement of said member for imparting positioning movements to said edge gage, said connections being adjustable to vary the amplitude of the movements transmitted thereby.

11. A machine for operating upon the bottom margin of a shoe having, in combination, means for operating upon a shoe, a shoe supporting jack, means for moving said jack relatively to the operating means to transfer the point of operation about the shoe, a templet fixed with relation to the jack and shoe supported thereon to provide a guiding surface around the shoe, an edge gage adapted to engage with the templet to position the shoe margin laterally with relation to the line of feed at the point of operation, means for controlling the position of the edge gage during the transfer of the point of operation about the shoe comprising a member having a predetermined fixed cycle of movements extending through said operation, connections controlled by the movement of said member for imparting positioning movements to said edge gage, and means for adjusting said connections to vary the amplitude of the positioning movements transmitted thereby.

12. A machine for operating upon the bottom margin of a shoe having, in combination, means for operating upon a shoe, a shoe supporting jack, means for moving said jack relatively to the operating means to transfer the point of operation about the shoe, a templet fixed with relation to the jack and shoe supported thereon to provide a guiding surface around the shoe, an edge gage adapted to engage with the templet to position the shoe margin laterally with relation to the line of feed at the point of operation, and means for controlling the position of the edge gage during the transfer of the point of operation about the shoe comprising a cam actuated in timed relation to the transfer of the operation around the shoe, actuating connections controlled by the cam, and means for adjusting said connections to cause the operating means to follow one of a plurality of predetermined marginal contour paths about the shoe.

13. A machine for operating upon the bottom margin of a shoe having, in combination, means for operating upon a shoe, a shoe supporting jack, means for moving said jack relatively to the operating means to transfer the point of operation about the shoe, a templet fixed with relation to the jack and shoe supported thereon and having a guiding contour surface determined for a shoe of a predetermined width and length, an edge gage adapted to engage with the templet to position the shoe margin laterally with relation to the line of feed at the point of operation, and means for controlling the position of the edge gage during the transfer of the point of operation about the shoe comprising a cam actuated in timed relation to the transfer of the point of operation around the shoe, actuating connections controlled by the cam, and means for adjusting said connections to cause the operating means to follow any one of a plurality of predetermined marginal contour paths about the shoe corresponding to shoes of the same length but of varying widths.

14. A machine for operating upon the bottom margin of a shoe having, in combination, means for operating upon a shoe, a shoe supporting jack, means for moving said jack relatively to the operating means to transfer the point of operation about the shoe, a templet fixed with relation to the jack and shoe supported thereon and having a guiding contour surface determined for a shoe of a predetermined width and length, an edge gage adapted to engage with the templet to position the shoe margin laterally with relation to the line of feed at the point of operation, and means for controlling the position of the edge gage during the transfer of the point of operation about the shoe comprising a cam actuated in timed relation to the transfer of the operation around the shoe, a movable member controlled by said cam, connections controlled by said member for positioning the edge gage, and means for adjusting said connections to vary the positioning movements imparted to said edge gage by the movement of said member.

15. A machine for operating upon the bottom margin of a shoe having, in combination, means for operating upon a shoe, a shoe supporting jack, means for moving said jack relatively to the operating means to transfer the point of operation about the shoe, a templet fixed with relation to the jack and shoe supported thereon and having a guiding contour surface determined for a shoe of a predetermined width and length, an edge gage adapted to engage with the templet to position the shoe margin laterally with relation to the line of feed at the point of operation, and means for controlling the position of the edge gage during the transfer of the point of operation about the shoe comprising a cam actuated in timed relation to the transfer of the operation around the shoe, a slide actuated by said cam, connections including cam and follower elements controlled by the movement of said slide to impart positioning movements to said edge gage, and means for adjusting the cooperative relationship of said cam and follower surfaces with relation to the slide to vary the positioning movements imparted to the edge gage by the movement of the slide.

ALFRED R. MORRILL.